May 18, 1965

F. LANG 3,183,647

CLEANING FILTER SURFACES

Filed April 29, 1960

INVENTOR
FRANZ LANG

BY
ATTORNEY

May 18, 1965 F. LANG 3,183,647
CLEANING FILTER SURFACES
Filed April 29, 1960 2 Sheets-Sheet 2

INVENTOR
FRANZ LANG

BY
ATTORNEY

United States Patent Office 3,183,647
Patented May 18, 1965

3,183,647
CLEANING FILTER SURFACES
Franz Lang, Merzbergstrasse 4, Lissberg,
Upper Hesse, Germany
Filed Apr. 29, 1960, Ser. No. 25,751
Claims priority, application Austria, Mar. 18, 1960,
A 2,089/60
9 Claims. (Cl. 55—96)

This invention relates to improvements in or relating to cleaning filter surfaces.

The prior art methods and devices for the pneumatic cleaning of planar filter surfaces have various disadvantages, which prevent their universal industrial utilization.

The use of hoses as filter elements in pneumatic cleaning requires the employment of compressed air stream which, by means of ring nozzles, blows the dust adherto the hose into the dust filter chamber. A portion of the blown-off dust resettles on the filter cloth, so that the dust load increases.

When using suction nozzles for cleaning hoses, the required quantity of air is very large and the drive mechanism for the hoses is complicated.

The use of drums as filter elements requires large dimensions with a relatively small filter surface, so that their use is limited to special cases.

The use of pocket-shaped filter elements, which are inserted from the outside and which are cleaned by means of a compressed air stream, has the disadvantage that the blown-off dust, which is very fine, is whirled up so that it resettles on the pockets. In order to minimize this phenomenon, it was necessary to increase the case dimensions and to stabilize the air stream by inserts.

Methods are also known in the prior art wherein planar filter surfaces are subjected to suction on the dust-collecting side by a nozzle, the filter being formed as a circular, rigid lattice and cleaned continuously on the dust-laden air side by a slotted suction pipe fulcrumed in the center of the circular surface.

All these prior methods have the common disadvantage that the quantity of air required for cleaning is very large and, in addition, that they require a large power consumption.

In view of the foregoing, it is an object of the present invention to provide means resulting in the elimination of the prior art disadvantages.

It is another object of the present invention to provide means facilitating the movement of the planar filter surfaces and the suction nozzles periodically or continuously toward each other so that the directions of motion are perpendicular or practically perpendicular to each other, a suction nozzle formed at the end of a suction arm being reciprocated or swivelled over the filter surface.

It is a further object of the present invention to provide means ensuring several circular planar filter surfaces to be arranged in spaced relation and parallel to each other on a common shaft, rotating with the latter, the suction arms associated with each filter surface, which arms are formed at one end thereof as suction nozzles and which extend beyond the filter surface, being connected at the other end thereof by means of a tube turn with a common suction line extending parallel to the shaft.

The suction arms connected with the suction pipe can swing or pivot about the axis of the suction pipe. The suction pipe is preferably disposed on the outside of the moving filter surfaces and parallel to the shaft.

It is a still further object of the present invention to provide means whereby, if circular planar filter surfaces are used, two or more can be disposed in ring or annular form, fulcrumed about their centers, and be passed over or subjected to the action of a suction nozzle disposed at the end of a suction arm. This method permits for many variations in the construction of devices for performing the method and the utilization thereof in practically all problems of dry dust removal.

In the drawings, which illustrate the best modes presently contemplated for carrying out the invention:

FIG. 1 illustrates the utilization of the method of the present invention for dust removal in rooms or the like;

Figure 1:
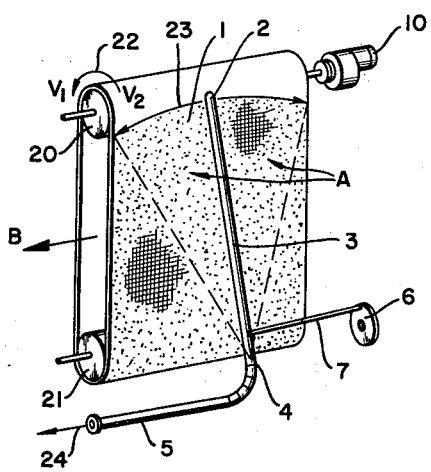

Referring now to FIG. 1 in detail, there is shown a filter cloth 1 which is conducted as an endless band over two rollers 20 and 21, roller 21 being driven in the direction of arrow 22 by a geared motor 10. An exhaust or suction arm 3, which has one end 2 formed as a suction nozzle and another end connected into a vertical dust exhaust or collection conduit or delivery line 5, is fulcrumed or pivoted about the fulcrum 4, outwardly of the stretched filter surface. Arm 3 is driven by a drive mechanism 6, here shown as a crank drive, in such manner that the nozzle 2 can swivel or reciprocate throughout the range or widthwise extent of the filter band, as shown by arrow 23.

The relative speed $v_1$ of the filter band and speed $v_2$ of the nozzle are so selected, continuously or in intervals, over a gear train (not shown in the drawing) that the entire filter surface is covered or scanned by the nozzle during one revolution of the band. The dust is conducted or drawn-off through the suction nozzle 2, the suction arm 3 and the adjoining delivery line 5, as shown by arrow 24, to any desired place or collection receptacle. The necessary auxiliary equipment is not shown in the drawing.

The filtered or purified air is exhausted or withdrawn from the zone defined by the opposing portions of the filter band, as indicated by the arrow B, while the dust-laden air impinges on or flows toward the filter band, as indicated by the arrows A. The casing or housing provided to obtain the necessary air-tight condition, encompasses the entire equipment like a picture frame, and is not shown in the drawing. The filter band can also be subjected to dust-laden air from both sides thereof. In this case, a suction worm is provided on the opposite side.

Figure 2:
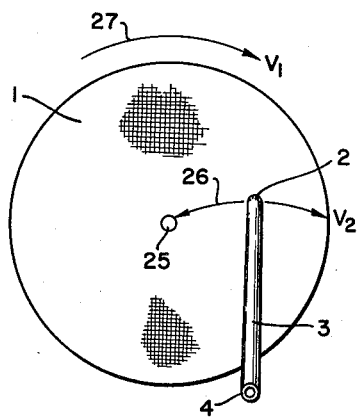
FIG. 2 illustrates the method utilizing circular planar filter surfaces.

FIG. 2 illustrates the application of the method of the present invention to a circular planar filter surface 1, which is rotated, as shown by arrow 27, about its center 25. The suction arm 3 provided with an end nozzle 2 can swing about the fulcrum 4 in the range of the radius of the circular surface, as shown by arrow 26. The relative speeds of rotation $v_1$, of the circular surface, and $v_2$, of the nozzle 2, are so releated to each other, that a full swing of the suction arm 3, the entire circular filter surface is covered or scanned by the suction nozzle 2.

Figure 3:
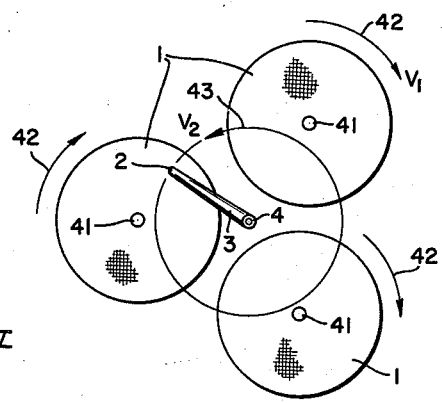
FIG. 3 illustrates the method utilizing several circular planar filter surfaces.

Referring now to FIG. 3 in detail, there is shown an embodiment utilizing circular planar filter surfaces 1. As here shown, three circular filter surfaces 1 are disposed in annular relation with each filter surface rotating about a central pivot 41, as shown by arrows 42. Provision is made for a suction arm 3 which is provided with a suction nozzle 2 at its free end and which is pivoted or fulcrumed at 4 so that the nozzle 2 covers or scans the filter surfaces during movement of the nozzle along its circular path 43. The speed of rotation of the filter surfaces is indicated by $v_1$ and the speed of rotary scanning of the nozzle 2 is indicated by $v_2$, said speeds being so selected, that the surface of each rotary filter is completely covered or scanned.

Figure 4:
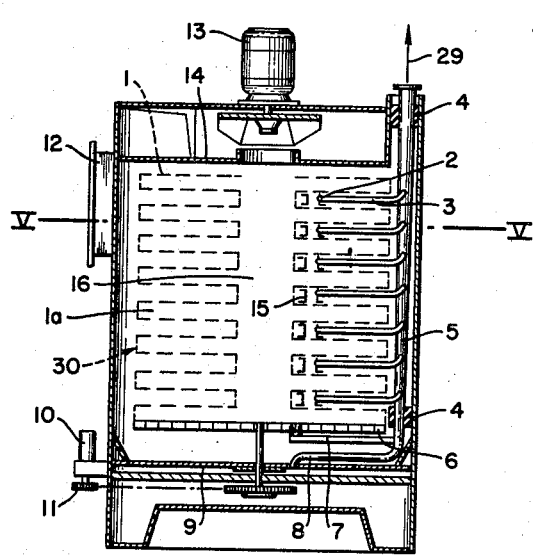
FIG. 4 is a longitudinal sectional view taken through one embodiment of a device pursuant to the present invention.
Figure 5:
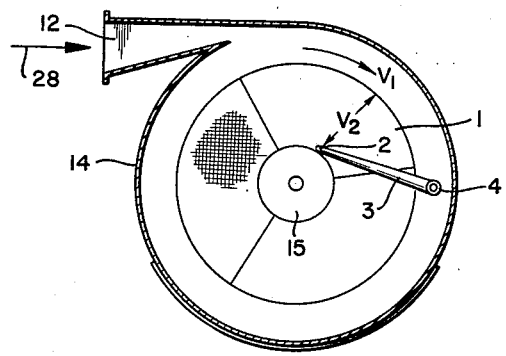
FIG. 5 is a cross sectional view taken along line V—V in FIG. 4.

A mechanism for carrying out the method illustrated in FIG. 2 is shown in FIGS. 4 and 5. The circular filter surfaces 1 are formed by the two end faces of round filter pockets 1a which are arranged in vertical or horizontal disposition in spaced relation on a common hollow shaft 16 which serves as a purified gas exhaust channel. The pockets rotate with the shaft 16.

A dust collector pipe 5 is provided with a plurality of suction arms 3. Each arm is disposed outside of the circumference of a companion filter pocket and parallel to the hollow shaft. The arms 3 each reciprocate through paths such that the double suction nozzles 2 carried thereby for the upper and lower filter surfaces cover the radial range of the filter pocket surfaces 1.

The suction nozzle head 15 has two opposing suction apertures, each of which is provided with a plate which is spaced a predetermined distance from the filter surface and is parallel thereto, in order to increase the effective exhaust surface. The drive for the suction arm 3 is effected via a guide bar 6, mounted on the blind bottom of the bottom filter pocket, this bar being engaged by a drive arm 7 by means of a guide piece. The bottom 9 of the filter housing 14 rotates with the pockets and is traversed by a separate suction arm 8 which also opens into or extends from the common dust collecting pipe 5. The drive of the pocket filter pack, generally indicated by reference numeral 30, is effected by means of the geared motor 10 and the transmission member 11.

The purified gas exhaust channel 16 is arranged in the partition of the filter casing 14 and of the built-in blower 13. The casing 14 serves as a preliminary separator. The gas inlet 12 extends tangentially of the casing, the dust-laden gas entering at arrow 28 and the filtered gas being discharged through the hollow channel 16.

In a horizontal arrangement of the filter pack 30, the dust separated in the casing is preferably collected in a dust collecting box disposed beneath the casing, or it is fed to the common collector pipe 5 by means of a collector worm and an adjoining suction pipe (not illustrated).

Figure 6:
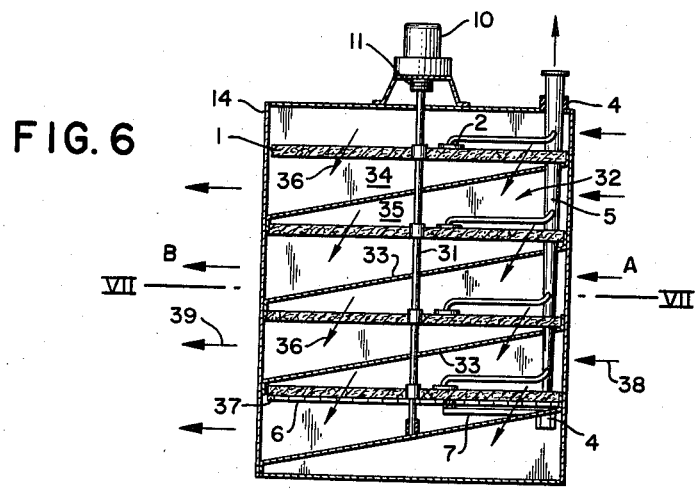
FIG. 6 is a longitudinal sectional view taken through another embodiment of the invention.
Figure 7:
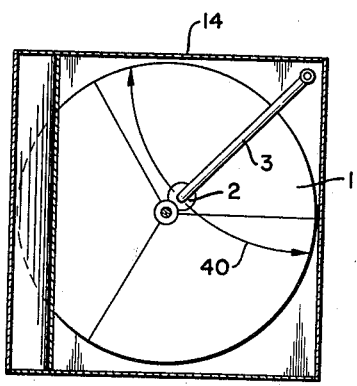
FIG. 7 is a cross sectional view taken along line VII—VII of FIG. 6.

FIGS. 6 and 7 show another embodiment of the present invention for removing dust from hot air. The circular filter surfaces 1, formed, for example, of glass wool, Glatex or asbestos mats, are mounted in spaced relation on a common shaft 31 and rotate with the latter. The spaces 32 between the parallel filter surfaces are subdivided into two parts by inclined bottoms or partitions 33.

The zone 34 above each inclined bottom 33 serves as a purified gas exhaust channel, the zone 35 below each bottom serves as a dust-laden air feeding channel. The hot air travels through the filters in the direction indicated by arrow 36. Heated air enters the filter casing 14, as shown by arrows 38, at side A of the casing, and leaves the latter at side B, as shown by arrows 39.

The suction arms 3, provided with suction nozzles 2, and the collector pipe 5 are similar to those previously described. The shaft 31 is driven by a pole-change geared motor 10 provided with the transmission member 11. On the lower surface 37 of the lowermost filter surface there is provided a helical guide bar 6 having a guide arm 7 and a guide piece so that the swivel or scanning motion, indicated by arrow 40, is transmitted to the suction pipe 5 which is fulcrumed in the two pivots or fulcrums 4.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The method of cleaning circular planar filter surfaces; comprising arranging said surfaces in spaced relation in a common plane, causing each surface to rotate about its center point, and rotating a suction nozzle through complete cycles of rotation so that it scans a part of all the filter surfaces during each cycle of rotation.

2. Filter cleaning apparatus; comprising a housing, a hollow rotary shaft provided in said housing as a purified gas exhaust channel, means defining circular filter surfaces, said means being mounted by said shaft and said surfaces defining spaced filter pockets, means for rotating said shaft with said filter surfaces, a suction arm for each filter surface, and means for effecting scanning movements of said filter surfaces by said suction arms.

3. Filter cleaning apparatus as in claim 2, each suction arm extending between adjacent filter surfaces and having two opposing nozzle apertures, each nozzle aperture having an associated plate which is parallel to the adjacent filter surface.

4. Filter cleaning apparatus as in claim 2, said housing having a bottom which rotates with said filter surfaces, and an additional suction arm mounted to effect scanning movements of said bottom to remove dust collected thereon.

5. Filter cleaning apparatus as in claim 2, said last mentioned means comprising a dust collector conduit mounted for rotary movement, said suction arms extending from said conduit.

6. Filter cleaning apparatus according to claim 5, including means for rotating said conduit so that each suction arm moves across the surface of its associated filter surface.

7. A filter comprising a rotatable shaft, a plurality of filter surfaces disposed at axially spaced locations along the shaft and rotatable therewith, means for directing dust laden fluid through said filter surfaces to trap dust thereon, and movable suction nozzle means adjacent said shaft including separate nozzles, each associated with a different one of said filter surfaces, and means for moving each said separate nozzle back and forth across its associated filter surface as said shaft is rotated.

8. A filter according to claim 7, wherein said filter surfaces are disposed horizontally and including baffle means for directing dust-laden fluid at an angle downwardly through said filter surfaces.

9. A filter according to claim 7, including a housing enclosing said filter surfaces, and means for introducing dust-laden air tangentially into said housing.

References Cited by the Examiner

UNITED STATES PATENTS

| | | |
|---|---|---|
| 1,995,648 | 3/35 | Rathbun. |
| 2,516,680 | 7/50 | Culpepper _ _ _ _ _ _ _ _ _ _ _ 55—294 X |
| 2,792,074 | 5/57 | Schilb et al. |
| 2,795,291 | 6/57 | Pierce. |

FOREIGN PATENTS

| | | |
|---|---|---|
| 353,837 | 1/30 | Great Britain. |
| 1,022,887 | 1/58 | Germany. |
| 1,063,915 | 8/59 | Germany. |

REUBEN FRIEDMAN, *Primary Examiner.*

HERBERT L. MARTIN, HARRY B. THORNTON, WALTER S. COLE, *Examiners.*